Figure 1:
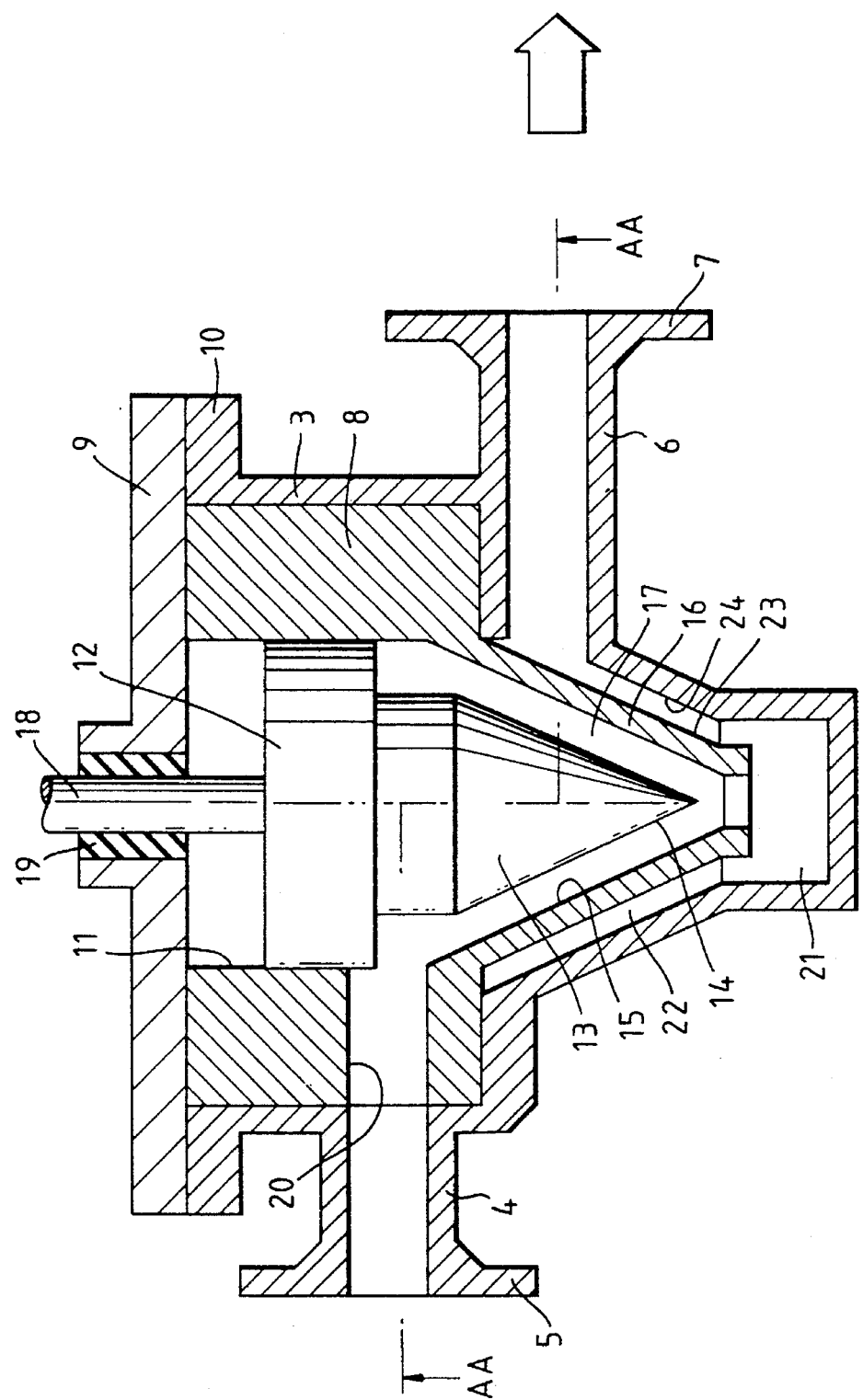

United States Patent [19]
Schubert et al.

[11] Patent Number: 5,605,172
[45] Date of Patent: Feb. 25, 1997

[54] FLUID CONTROL VALVE AND METHOD FOR SUBJECTING A LIQUID TO A CONTROLLED PRESSURE DROP

[75] Inventors: Mark F. Schubert, Houston, Tex.; Frank Skilbeck, Gloucester, United Kingdom

[73] Assignee: Baker Hughes Limited, London, England; by said Frank Skilbeck

[21] Appl. No.: 289,675

[22] Filed: Aug. 11, 1994

(Under 37 CFR 1.47)

[30] Foreign Application Priority Data

Aug. 27, 1993 [GB] United Kingdom ............... 9317889

[51] Int. Cl.$^6$ ....................................... F16K 1/38
[52] U.S. Cl. ............... 137/1; 251/122; 251/903
[58] Field of Search ............... 251/122, 359, 251/903; 137/315, 1

[56] References Cited

U.S. PATENT DOCUMENTS 3,198,214  8/1965  Lorenz.

5,201,491  4/1993  Domangue ...................... 251/122

FOREIGN PATENT DOCUMENTS 2588778  4/1987  France.
0208364  12/1982  Japan ............................. 251/122

Primary Examiner—Kevin Lee
Attorney, Agent, or Firm—Andrus, Sceales, Starke & Sawall

[57] ABSTRACT

A method and apparatus for subjecting a fluid to a controlled pressure drop. Fluid is supplied under pressure with a tangential velocity component to an annular passageway (17). The fluid swirls around the axis of the passageway while flowing axially along the passageway to an outlet (6). A cross section of at least a part of the passageway (17) is adjustable to enable the flow rate to be adjusted for a given pressure loss or the pressure loss to be adjusted for a given flow rate. The outlet (6) includes a second annular passageway (22) surrounding the first annular passageway so that the first annular passageway leads to, and the second annular passageway leads from, a chamber (21) common to the passageways. The second annular passageway is of increasing outer diameter and cross sectional area in the direction of flow from the chamber to the outlet.

11 Claims, 2 Drawing Sheets

FLUID CONTROL VALVE AND METHOD FOR SUBJECTING A LIQUID TO A CONTROLLED PRESSURE DROP

There is frequently a requirement when processing fluids under pressure to subject the fluid to a pressure drop in order to achieve a desired fluid pressure or flow rate. Conventionally this is achieved by passing the liquid through a control valve having a variable orifice across which the pressure loss occurs. Although the design of the orifice is varied in dependence upon the particular application, in most instances the pressure loss is sudden, resulting in very high velocities. This may cause high liquid shearing, particularly in the oil industry, where oil and water mixtures are processed, since the shearing can result in liquid emulsification, making further liquid separation processes more arduous.

In accordance with the present invention, in a method of subjecting a fluid to a controlled pressure drop, the fluid is supplied under pressure with a tangential velocity component to an annular passageway, a cross section of at least a part of which is adjustable, such that the fluid swirls around the axis of the passageway while flowing axially along the passageway to an outlet.

This method, which subjects the fluid to an action similar to that which would occur in a hydrocyclone having no overflow outlet, provides a gradual pressure drop. The outer diameter of the part of the passageway having an adjustable cross section preferably reduces in the axial direction of flow, as with a conventional hydrocyclone, in order to maintain the angular velocity of the swirl as energy is lost. The adjustability of the cross section of the annular passageway enables the flow rate to be adjusted for a given pressure loss, or the pressure loss to be adjusted for a given flow rate. The gradual nature of the pressure drop avoids excessive velocities, or sudden changes in velocity, so that liquid shearing will be minimised or eliminated. Furthermore, the swirling motion will induce centrifugal forces causing dispersed lighter phase fluids, say oil in water, to migrate towards the inner peripheral wall of the passageway where they may coalesce and form large, more easily separated, droplets. Conversely, if the dense phase is the dispersed phase, then this may coalesce on the outer peripheral wall of the annular passageway.

In order to avoid undue turbulence, and possible reemulsification where the still swirling liquid passes to and through the outlet, even if the outlet is a tangential outlet, the swirl may be dissipated by providing the outlet with a second annular passageway of increasing outer diameter and cross section in the axial direction of flow. This can be achieved in a compact manner if the second annular passageway surrounds the first annular passageway, and the axial direction of flow is reversed in passing from the first to the second passageway.

Further benefits of this method are low noise, little cavitation, and a wide control range.

One structure of fluid control valve which is suitable for use in carrying out the method of the present invention comprises an outer body having an inner wall surface defining a cavity of substantially circular cross section which reduces in diameter from one end to the other; and a plug located within the wider end of the cavity and having an outer wall surface of substantially circular cross section which is spaced radially inwardly from the inner wall surface of the outer body to define an annular passageway, the plug being axially movable relatively to the outer body to vary the width of the annular passageway between the plug and a convergent portion of the inner wall surface of the outer body; at least one tangential fluid inlet leading into the annular passageway at the end of the annular passageway nearer to the wider end of the cavity, and a fluid outlet at the narrower end of the cavity.

The convergent portion of the inner wall surface of the outer body may be substantially frustoconical and faces a complementary substantially conical portion of the outer wall surface of the plug.

The plug may have a head portion which progressively obstructs the inlet when the plug is moved axially towards the narrower end of the cavity to reduce the width of the annular passageway.

When the outlet is to include a second annular passageway of increasing outer diameter and cross section in the axial direction of flow, the second annular passageway may surround the first annular passageway and be divided therefrom by an annular wall of the outer body, the first annular passageway leading to, and the second annular passageway leading from, a common chamber.

Figure 2:
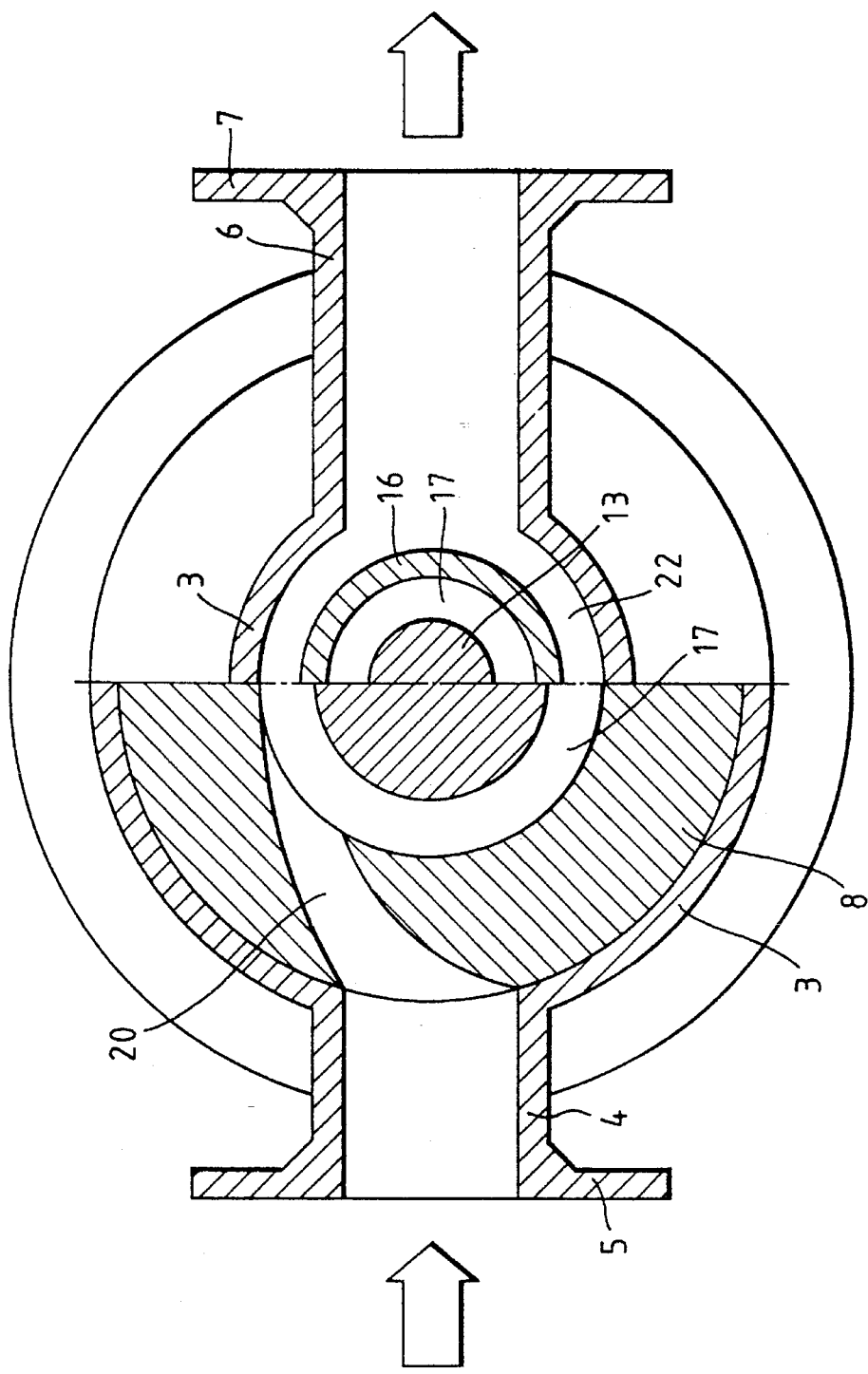

As example of a fluid control valve, for use in accordance with the present invention is illustrated in the accompanying drawings, in which: FIG. 1 is an axial section of the essential parts of the valve; and, FIG. 2 is a section taken on the line AA—AA in FIG. 1.

The illustrated valve has an outer casing 3 integrally formed with a tubular inlet portion 4 having a connecting flange 5 and a tubular outlet portion 6 having a connecting flange 7. Within the casing 3 is located an outer body 8 by means of a cover plate 9 which may be bolted to a flange 10 of the casing. Within an upper inner cylindrical wall portion 11 of the body 8 there slides a cylindrical head 12 of a conical plug 13 having an external wall surface 14. The wall surface 14 cooperates with a frustoconical inner wall surface 15 of a depending annular wall 16 of the body 8. The wall surfaces 14 and 15, which have the same conical included angle, define therebetween an annular passageway 17 the radial width and cross section of which can be varied by axial movement of the plug 13. A stem 18 is attached to the head 12 of the plug and passes through a seal 19 in the cover plate 9. The plug may therefore be adjusted in position via the stem 18, by means of any appropriate motive force, such as a fluid cylinder, or a motor or manually driven screw.

The inlet passage through the tubular portion 4 leads through an involute passage 20 tangentially into the upper end of the passageway 17 so that fluid entering the valve will swirl around the passageway as it passes axially down the passageway. The outlet from the passage 20 is shown partly obstructed by the plug head 12 in FIG. 1.

The lower end of the passageway 17 leads into a cylindrical chamber 21 formed in the lower portion of the casing 3. A further, divergent, passageway 22 leads from the periphery of the chamber 21 back up around the passageway 17 between an external frustoconical wall surface 23 of the wall 16 and an inner frustoconical wall surface 24 of the casing 3. The included conical angles of the wall surfaces 23 and 24 are the same as one another and, in fact, the same as those of the wall surfaces 14 and 15.

At its upper end the second annular passageway 22 is coupled to the outlet passage within the tubular portion 6.

It is claimed:

1. A method of subjecting a fluid to a controlled pressure drop, wherein said fluid is supplied under pressure with a tangential velocity component to a first annular passageway having an axis, at least a portion of the annular passageway having a decreasing outer diameter in a first direction along the axis, a cross section of at least a part of said first passageway being adjustable by means of a tapered, annular passage forming member movable along the axis, said fluid swirling around said axis of said first passageway while flowing axially along said first passageway in the first direction, said fluid thereafter flowing to an outlet through a second annular passageway having an increasing outer diameter and cross sectional area in a second direction along said axis.

2. A method according to claim 1, wherein said second annular passageway surrounds said first annular passageway and said axial direction of flow is reversed in passing from said first to said second passageway.

3. A method according to claim 1 wherein said first annular passageway has a decreasing cross sectional area in said first direction along said axis.

4. A fluid control valve comprising an outer body having an inner wall surface with a convergent portion and defining a cavity of substantially circular cross-section which reduces in diameter from a first end to a second end thereof; a plug located within said first end of said cavity and having an outer wall surface of substantially circular cross section which is spaced radially inwardly from said inner wall surface of said outer body to define therebetween an annular passageway extending from said first end to said second end, said annular passageway having a width and an upstream end proximate to said first end of said cavity; means for axially moving said plug relative to said outer body to vary said width of said annular passageway between said plug and said convergent portion of said inner wall surface of said outer body; at least one tangential fluid inlet leading into said annular passageway at said upstream end thereof;

a chamber at said second end of said cavity; and a second annular passageway having one end coupled to said chamber and having the other end coupled to an outlet for said valve, said second annular passageway having an increasing outer diameter and cross sectional area in a direction extending from said one end to said other end.

5. A valve according to claim 4, in which said convergent portion of said inner wall surface of said outer body is substantially frustoconical and faces a complementary substantially conical portion of said outer wall surface of said plug.

6. A valve according to claim 4, in which said plug has a head portion which progressively obstructs said inlet when said plug is moved axially towards said second end of said cavity to reduce said width of said annular passageway.

7. A valve according to claim 5, in which said plug has a head portion which progressively obstructs said inlet when said plug is moved axially towards said second end of said cavity to reduce said width of said annular passageway.

8. A valve according to claim 4, wherein said second annular passageway surrounds said first annular passageway and is divided therefrom by an annular wall of said outer body.

9. A valve according to claim 5, wherein said second annular passageway surrounds said first annular passageway and is divided therefrom by an annular wall of said outer body.

10. A valve according to claim 6, wherein said second annular passageway surrounds said first annual passageway and is divided therefrom by an annular wall of said outer body.

11. A valve according to claim 7, wherein said second annular passageway surrounds said first annular passageway and is divided therefrom by an annular wall of said outer body.

* * * * *